United States Patent [19]

Diete et al.

[11] Patent Number: 5,281,471
[45] Date of Patent: Jan. 25, 1994

[54] MULTI-LAYERED PLASTIC FOIL FOR PACKAGING

[75] Inventors: Günter Diete, Schrattenbach; Arthur Fischer, Immenstadt; Nikolaus Remer, Munich, all of Fed. Rep. of Germany

[73] Assignee: Viatech Holding GmbH, Kempten, Fed. Rep. of Germany

[21] Appl. No.: 799,128

[22] Filed: Nov. 27, 1991

[30] Foreign Application Priority Data

Dec. 19, 1990 [DE] Fed. Rep. of Germany ....... 4040586

[51] Int. Cl.[5] .................. B32B 3/26; B32B 23/02; B29D 23/00; B65D 79/00
[52] U.S. Cl. ................... 428/305.5; 428/192; 428/35.8; 428/35.9; 428/36.5; 428/36.6
[58] Field of Search ............ 428/321.5, 305.5, 704, 428/913, 35.8, 35.9

[56] References Cited

FOREIGN PATENT DOCUMENTS 3447833 7/1986 Fed. Rep. of Germany .

*Primary Examiner*—P. C. Sluby
*Attorney, Agent, or Firm*—Jacobson, Price, Holman & Stern

[57] ABSTRACT

A foil for use in the vacuum packaging of an article comprises first and second foil layers, the second foil layer being a plastics matrix incorporating a volatile substance such that in use, after evacuation and closing of the package, the volatile substance slowly diffuses into the package, thereby exerting a beneficial influence on the article, for example protection against corrosion.

11 Claims, 1 Drawing Sheet

MULTI-LAYERED PLASTIC FOIL FOR PACKAGING

FIELD OF THE INVENTION

This invention relates to a multi-layered foil of plastics material for use in vacuum packaging of an article.

The packaged article can take many forms. For instance, instruments for medical purposes can be packaged in this way, or other articles which must be protected from external influences. The packaged article may also be an article of food.

DESCRIPTION OF THE PRIOR ART

The use of multi-layered foils in vacuum packaging is known. The various layers of the foil perform different functions. For example, one layer gives the foil mechanical strength while another layer provides imperviousness or sealing ability. In other cases one or more layers is particularly suited to enable the foil to be stretched in order to provide a good fit to the packaged article, or to bring about shrinkage during warming.

After the packaging process, the foil lies more or less closely about the packaged article. The stability of the package or the packaged article depend respectively in large measure on the imperviousness of the foil and on the way in which the packaged article changes with time.

German Patent Application No DE-OS 34 47 833 discloses a cloth, foil or the like containing microcapsules of an active ingredient. Active ingredients which are mentioned include a preservative or the like. When the multi-layered foil of this kind is used the microcapsules burst, releasing the active ingredient.

BRIEF SUMMARY OF THE INVENTION

An object of the invention is to provide a package with which it is possible to improve the stability of the packaged article. To achieve this object, the invention is based on a multi-layered foil of plastics material for use in vacuum packaging. According to the invention, this foil is characterized in that a foil layer disposed towards the packaged article is a plastics matrix in which volatile substances are stored such that after evacuation and closing of the package the volatile substances slowly diffuse into the package.

Previously in the packaging art it has been customary to seek to achieve long-term stability for packaged articles by preparing the article, for example with a corrosion-inhibiting protective surface layer, and then to package the article with as good a seal as possible. In contrast, the present invention is based on the principle of not only protecting the packaged article from external influences during the period of packaging or storage, but also to positively influence the packaged article with beneficial substances which are present in the packaging foil from the outset and which, after evacuation and closing of the package, slowly diffuse into the package under the influence of the vacuum. In this way, a positive influence is exerted on the packaged article after packaging, in order, for example, to increase the stable life of the article.

The present invention is based on a cooperation between the vacuum in the vacuum package and the stored substances, in order to draw the substances out of the plastics matrix and into the interior of the package, thereby exerting a longer influence on the packaged article.

The vacuum used in the invention may be of the quality which is conventionally achieved in vacuum packaging machines. It is not necessary always to provide a very high vacuum. The vacuum present in a skin-package too is generally sufficient for use in the invention.

In the invention it is envisaged that the outermost layer of the foil will be mainly responsible for the imperviousness of the package. The foil layer disposed towards the packaged article does not have to contribute to the imperviousness of the package, but can take up the volatile substances and slowly release them under the influence of the vacuum.

In particular, the outermost foil layer can act as an oxygen barrier, to inhibit or reduce the undesirable effect of atmospheric oxygen.

The foil layer disposed towards the packaged article must not necessarily be the innermost layer. It is possible to cover the plastics matrix also on the side adjacent the packaged article, provided of course that the covering layer is sufficiently porous to achieve the desired effect. This innermost layer can for example be provided to improve the seal, for example where the packaged article is enclosed between two foils which are sealed together at their peripheral edges.

Conventional methods can be used for the connection of the various layers of the foil according to the invention. It is envisaged that the layers, in particular the outermost layer, can be applied as a dispersion.

It is particularly envisaged that the plastics matrix can store reducing substances which during storage take up oxygen from the package, irrespective of its origin, and prevent its undesirable effect on the packaged article.

Corrosion inhibitors can also be stored in the plastics matrix. These substances are slowly released onto the surface of the packaged article and suppress corrosion, e.g. rusting or other undesirable changes to the surface of the packaged article.

In another embodiment, anti-bacterial substances can be stored in the plastics matrix. This has the advantage that the anti-bacterial effect occurs during storage, at later times at which further infections are possible. The substances in the plastics matrix therefore become effective at a time at which other substances, which may have been applied to the packaged article before packaging, become less effective.

In another embodiment of the invention, aromatic substances can be stored in the plastics matrix. This can lead to a longer-lasting atomization which is less susceptible to undesired reaction between the packaged article and the aromatic substance.

In another embodiment of the invention, anti-aging substances are stored in the plastics matrix. It is particularly flavor that these substances should be released and take effect as the packaged article ages.

In a particular embodiment of the invention, sodium nitrite is stored in the plastics matrix to enable, for example, the corrosion-inhibiting effect of this substance to be utilized.

A further embodiment of the foil according to the invention involves the use of health-related substances. Such substances can for example inhibit undesirable changes in the packaged article. In this connection, one possibility is the use of ascorbic acid.

The stored substances can also be of a form suitable for preventing undesirable color changes in the packaged article.

Obviously, a combination of various volatile substances may be used in the invention.

The substances can be introduced into the plastics matrix in various ways. The substances may be introduced into the material before formation of the foil, for example before the foil-blowing process. In other cases, it may be advantageous to bring a carrier film into contact with dispersions containing the substances in question, which after drying constitute the foil layer disposed towards the packaged article. The relatively low absorptive capacity of certain foils may also be used to introduce the substances into the foil.

DETAILED DESCRIPTION OF PREFERRED EMBODIMENTS

Figure 1:
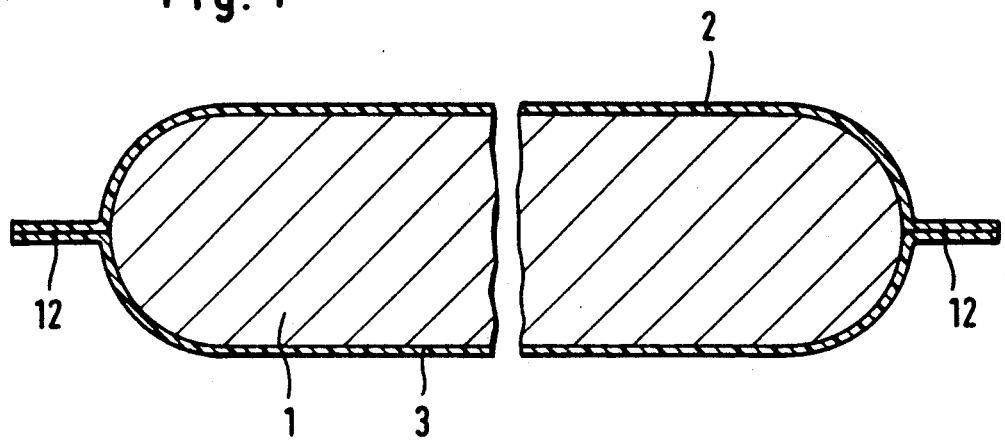
FIG. 1 is a sectional view of an evacuated package.

Referring first to FIG. 1, a package comprises an object 1 of arbitrary shape surrounded on all sides by multilayer foils 2,3. The foils 2,3 are tightly sealed together at their edge region 12, the internal space between the foils 2,3 which receives the object 1 having been evacuated before sealing.

Figure 2:
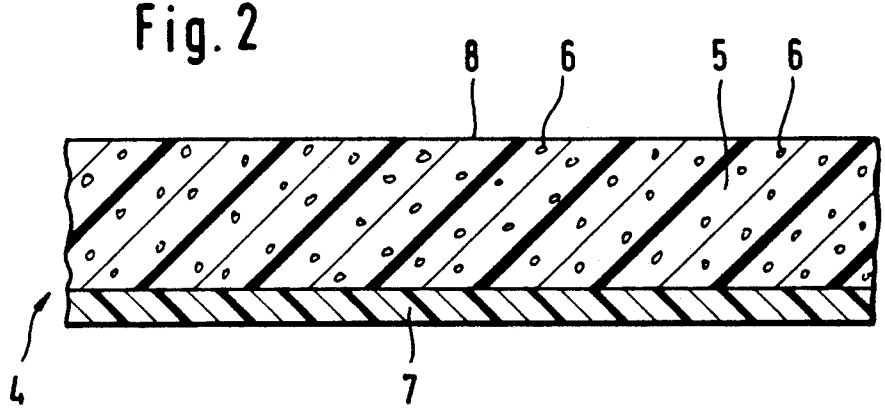
FIG. 2 is a sectional view on a larger scale of a first multilayer foil according to the invention used in the evacuated package of FIG. 1.

Referring now to FIG. 2, the foils 2,3 comprise a multi-layered foil 4 comprising a first layer 5 in the form of a plastics matrix. Substances incorporated into the plastics matrix 5 are shown in FIG. 2 as small particles 6. The plastics matrix 5 with the incorporated substances may, however, be fully homogeneous, as would be the case, for example, where the substances are dissolved in the plastics matrix 5.

The plastics matrix 5 is connected to a further foil layer 7, which represents the outermost layer of the multi-layer foil. The multi-layer foil 4 thus lies with the surface 8 on the object 1. The layer 7, which can be applied as a dispersion, serves to ensure the imperviousness of the package.

Figure 3:
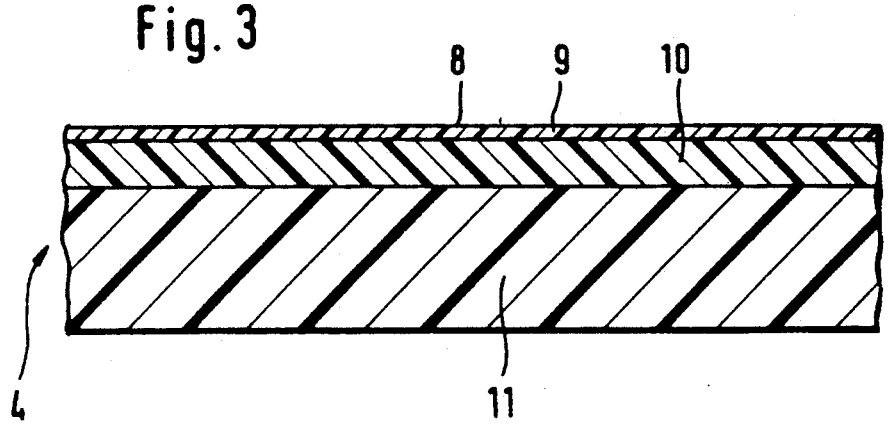
FIG. 3 is a sectional view on a larger scale of a second multilayer foil according to the invention.

In the embodiment shown in FIG. 3, the multi-layer foil 4 comprises three layers. A relatively thin inner layer 9 is provided, which lies with its surface 8 on the packaged article. This layer 9 can for example be applied as a dispersion. A second layer 10 serves as a carrier for the layer 9 or as a bonding layer. Finally, a third layer 11 gives the multi-layered foil 4 mechanical strength and enables sealing at the edge region 12.

The inner layer 9 comprises or contains volatile substances which slowly diffuse into the package after evacuation and closing of the package.

We claim:

1. Multi-layered plastic foil for use in the formation of a package for an article by vacuum packaging, which foil comprises:

a first foil layer which renders the package substantially impervious;

a second foil layer in the form of a plastics matrix; and a volatile substance incorporated into said second foil layer, the arrangement being such that in use said first foil layer is disposed outwardly and said second foil layer is disposed inwardly of the package, and after evacuation and closing of the package said volatile substance slowly diffuses into the package under the influence of vacuum; such that there is a cooperation between the vacuum in the vacuum package and the said substance, in order to draw the substance out of the plastics matrix and into the interior of the package thereby exerting a longer influence on the package article.

2. Multi-layer foil according to claim 1, wherein said first foil layer is impervious to oxygen.

3. Multi-layer foil according to claim 1 wherein a dispersion of the foil material is applied to the surface to form at least one of said first or second foil layers.

4. Multi-layer foil according to claim 1, wherein said volatile substance is a reducing substance.

5. Multi-layer foil according to claim 1, wherein said volatile substance is a corrosion-inhibitor.

6. Multi-layer foil according to claim 1, wherein said volatile substance is an anti-bacterial substance.

7. Multi-layer foil according to claim 1, wherein said volatile substance is an aromatic substance.

8. Multi-layer foil according to claim 1, wherein said volatile substance is an anti-aging substance.

9. Multi-layer foil according to claim 1, wherein said volatile substance is sodium nitrite.

10. Multi-layer foil according to claim 1 wherein said volatile substance is selected from a group consisting of reducing substance, corrosion inhibitor, anti-bacterial substance, aromatic substance, anti-aging substance and sodium nitrite.

11. Multi-layer foil according to claim 1 wherein various combination of volatile substances are employed.

* * * * *